United States Patent [19]
Bondy

[11] B 3,989,661
[45] Nov. 2, 1976

[54] METHOD FOR ENLARGING THE PARTICLE SIZE OF POLYMERS PREPARED BY AQUEOUS EMULSION POLYMERIZATION

[75] Inventor: Clemens Bondy, Harlow, England

[73] Assignee: Revertex Ltd., Harlow, England

[22] Filed: May 7, 1973

[21] Appl. No.: 358,260

[44] Published under the second Trial Voluntary Protest Program on March 30, 1976 as document No. B 358,260.

[30] Foreign Application Priority Data
May 12, 1972 United Kingdom............... 22507/72

[52] U.S. Cl. ...................... 260/29.7 PT; 252/311.5; 260/23 R; 260/23 EM; 260/23 P; 260/29.6 PT; 260/29.7 E; 260/29.7 EM; 260/410.6; 264/117

[51] Int. Cl.$^2$ .................. C08L 21/02; C08L 25/10; C08L 27/08; C08L 27/22

[58] Field of Search ............. 260/29.7 EM, 29.7 PT, 260/29.7 E, 29.6 PT, 410.6, 23 R, 23 P, 23 EM; 252/311.5; 264/117

[56] References Cited
UNITED STATES PATENTS

| | | | |
|---|---|---|---|
| 2,457,139 | 12/1948 | Fife et al............................ | 260/410.6 |
| 2,993,002 | 7/1961 | Wright et al...................... | 252/311.5 |
| 3,097,178 | 7/1963 | Townsend et al.................. | 260/29.6 |
| 3,288,741 | 11/1966 | Cheng........................... | 260/29.7 PT |
| 3,850,868 | 11/1974 | Wismer et al...................... | 260/29.3 |

Primary Examiner—John C. Bleutge
Assistant Examiner—T. DeBenedictis, Sr.

[57] ABSTRACT

The average particle size of latices of polymers prepared by aqueous emulsion polymerization of ethylenically unsaturated and/or diolefinic monomers is increased markedly by admixture therewith of polyethoxylated surfactants having an HLB Value of 16–19.5 which are based on either long chain alkyl amines and/or esters of aliphatic polyols and fatty acids.

14 Claims, No Drawings

METHOD FOR ENLARGING THE PARTICLE SIZE OF POLYMERS PREPARED BY AQUEOUS EMULSION POLYMERIZATION

This invention relates to a process for enlarging or agglomerating, i.e. coarsening irreversibly, the particles contained in a polymer dispersion. In particular, the invention is concerned with polymer dispersions obtained by emulsion polymerization of ethylenically unsaturated or polyunsaturated monomers.

Preferred polymer dispersions (latex polymers) for which the method of the invention can best be used are the water immiscible emulsion homopolymers and copolymers of $C_{4-6}$ conjugated diolefins such as butadiene, isoprene, chloroprene, 2,3-dimethyl-butadiene and 2-methyl-butadiene. Suitable comonomers include ethylenically unsaturated compounds such as vinyl aromatic compounds (styrene, 2-methylstyrene, vinyl toluene, divinyl benzene, and chlorinated styrenes), vinylidene chloride, vinyl pyrrolidone, acrylic nitriles (acrylonitrile, methacrylonitrile), lower alkyl esters of acrylic acids (ethyl acrylate, methylmethacrylate and butylacrylate), carboxylic acid amides and copolymerizable α-β-unsaturated carboxylic acids, (acrylic, methacrylic, itaconic, maleic and fumaric acids) and the lower alkyl monoesters of polymerizable dicarboxylic acids (monomethyl itaconate).

In the preparation of polymer dispersions by emulsion polymerization of ethylenically unsaturated or polyunsaturated monomers, it is often advantageous to make the dispersions with particles of small diameter, typically in the range of 0.05 to 0.25 $\mu$. in order to benefit from the high rates of conversion of monomer to polymer obtainable when the particle size is small. However, in many technological applications, fine particled polymer dispersions suffer from certain drawbacks, such as a low tolerance towards fillers, pigments, vulcanizing ingredients and the like, as well as from instability towards agitation, shearing forces and other mechanical influences. Further drawbacks may be found in the rheological properties of fine particled dispersions, notably high viscosity at low shear rates or at high concentration.

In order to overcome the disadvantages of fineparticled dispersions, various processes have been proposed for agglomerating the particles. Some of these processes are purely physical, involving the expenditure of energy, some are chemical and some are a combination of physical and chemical processes. Many of these processes can not be applied to latex polymers derived from mixtures of monomers of which at least one provides hydrophilic groups in the polymer, e.g. carboxylated latices, or can not be applied to such latex polymers in such a way as to provide reproducible results.

Among chemical agglomerating agents, it has been proposed to employ polyethoxylated compounds of the formula

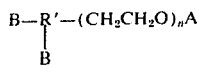

where
R is an organic hydrophobic group
A is a hydrogen atom or an $R(CH_2CH_2O)_m H$ group
B is a hydrogen atom or an $(CH_2CH_2O)_p H$ group
n, m and p are each 23 to 455 and the weight ratio of R to ethylene oxide chains is from 1:3 to 2:1.

The preferred chemical agglomerating agents of the above formula are obtained by reacting polyoxyethylene glycol with the reaction product of a polyhydric phenol and epichlorohydrin.

It has also been indicated that in order to agglomerate a synthetic rubber containing carboxy groups, it is necessary that the latex should have a content of free emulsifier of from 0.1 to 3.5% with reference to latex solids, and that from 10 to 55% of the carboxylic groups contained in the synthetic rubber should be neutralized. The amount of emulsifier may be increased to 4.0% and up to 70% of the carboxyl groups may be neutralized if the pH during polymerization is maintained in the range from 1.5 to 3.6. It is believed that these critical conditions are necessary with certain disclosed agglomerating agents and that such carboxylated latices can not be agglomerated or reproducibly agglomerated with certain other previously proposed chemical agglomerating agents or physical agglomerating processes.

We have now discovered a class of polyethoxylated compounds which are useful for agglomerating both carboxylated and non-carboxylated polymers over a wide range of conditions and which do not require critical conditions as to free emulsifier content and neutralization of carboxyl groups, if present.

The surfactants having this effect belong to the class of non-ionic polyethoxylated high and/or substituted long chain fatty acid esters and higher hydrocarbyl amines. In particular the polyethoxylated fatty acid esters are those of aliphatic (including cycloaliphatic) polyols. Examples of suitable esterifying polyols are glycerol, sorbitol, pentaerithritol, alkylene glycols, dialkylene glycols, trimethylol propane, mannitol, glucose and sucrose. The preferred fatty acid esters are the readily and economically available glycerides contained in or derived from naturally occurring oils and fats.

Typical compounds useful for carrying out the present invention include the following:

1. Polyethoxylated completely esterified polyols, such as glycerol, alkylene glycols, pentaerithritol, sorbitol, mannitol and trimethylol propane, in which at least one of the esterifying long chain fatty acids contains a substituent group on its hydrophobic long chain capable of reacting with ethylene oxide to append a poly(ethylene oxide) chain, e.g. amino or hydroxy groups. Ricinoleic and 12-hydroxy stearic acids are examples of such substituted fatty acids and suitable surfactant compounds of this type are represented by polyethoxylated castor oil or polyethoxylated hydrogenated castor oil;

2. Polyethoxylated partial fatty acid esters of polyols, such as glycerol, sorbitol, ethylene glycol, di-ethylene glycol and trimethylol propane, in which one or more of the esterifying long chain fatty acids may contain ethoxylatable substituent groups as described immediately above; and 3. Polyethoxylated long chain alkyl amines (including aralkyl amines), optionally containing one or more ethoxylatable substituent groups on the alkyl chain.

In the case of both the fatty acid components of the esters and the alkyl amines described above it is preferred that the hydrophobic portions thereof be from about 12 to about 22 carbon atoms in length and preferably from about 14 to 20 carbon atoms.

The polyethoxylated surfactants of this invention are further characterized by having:

1. An HLB number in the range of from 16 to 19.5. A definition of the term "HLB number" is given in articles by W. C. Griffin in Journal Soc. Cosmetic Chemists, Volume 1, p.311 (1949) and Volume 5, p.249 (1957). For the purpose of this invention, the HLB number may be calculated from the expression $$\frac{H}{M} \times 20$$

where H is the molecular weight of the hydrophilic portion of the polyethoxylated surfactant and M is the total molecular weight of the surfactant. In the case of polyethoxylated fatty acid esters of polyols, H may be represented with sufficient accuracy by the molecular weight of the polyoxyethylene chains plus the molecular weight of the polyol. In the case of the polyethoxylated amines, H may be represented by the molecular weight of the polyoxyethylene chains only; and 2. A molecular weight in the range of from 1800 to 25,000 and preferably in the range of from 2500 to 20,000.

The polymer dispersions capable of being coarsened or agglomerated by the present process are those stabilized predominantly by surfactants and/or by the presence in the polymer of hydrophilic comonomers, examples of which are $\alpha,\beta$-ethylenically unsaturated mono- di- or polycarboxylic acids, di- or poly-carboxylic acid partial alkyl esters, carboxylic acid amides, carboxylic acid monoesters of diols or polyols, carboxylic esters of amino-alcohols and vinyl pyrrolidone.

Surfactant dispersion stabilizers are well known to those skilled in the art of emulsion polymerization. Typical examples are the higher alkyl esters of sulphosuccinic acid, the $C_8$ to $C_{20}$ hydrocarbyl sulphates or sulphonates and the polyethoxylated alkanols, alkylated phenols, alkanoic acids or acid amides and their sulphated, sulphonated or phosphated derivatives.

It is a further prerequisite of the present process that the surfaces of the dispersed polymer particles are incompletely covered by any stabilizing surfactants. This may be determined by soap titration according to Nouben-Weyl "Methoden der organischen Chemie" Vol. 14/1, p.370, and will usually be found to be the case if the surface tension of the polymer dispersion is higher than 50 dynes/cm. and preferably higher than 55 dynes/cm.

For irreversible coalescence of fine particles to coarser ones to take place, it is furthermore necessary that the polymer constituting the major volume proportion of the dispersed polymer particles, e.g. in a dispersion of mixed polymers, should have a glass transition temperature (Tg) below and preferably more than 20°C. below the temperature at which the coalescence is induced. Fortunately, many polymers, e.g. those containing a high proportion of butadiene and/or isoprene and/or acrylic acid esters of higher alkanols have a glass transition temperature well below 0°C. Thus, irreversible coalescence can frequently be readily achieved at ambient temperature when employing the present process.

Based on the foregoing, the present invention broadly provides a process for enlarging the particle size of a polymer dispersion, wherein the polymer dispersion is mixed with a surfactant which is a non-ionic polyethoxylated high and/or substituted fatty acid ester or higher hydrocarbyl amine. In particular, the surfactant should have an HLB number (as hereinbefore defined) of from 16 to 19.5 and a molecular weight of from 1800 to 25,000, while the polymer should be stabilized either by groups derived from hydrophilic monomers or by a stabilizing surfactant present in an amount which is not sufficient completely to cover the surfaces of the dispersed particles. Finally, the enlarging process should take place at a temperature above the glass transition temperature of the polymer constituent constituting the major volume proportion of the dispersed polymer.

In order to carry the present process into effect, the polyethoxylated surfactant is preferably first dissolved in a suitable solvent for the surfactant, ordinarily in water or a water-containing mixture, and is then mixed with the polymer dispersion to be treated. The surfactant solution may be added to the polymer dispersion or vice versa. The quantity of surfactant employed may vary from 0.01 to 5 parts dry per 100 parts of polymer contained in the dispersion. Preferably the quantity is in the range of 0.02 to 1.0 part of surfactant per 100 parts of polymer.

The polyethoxylated surfactants used in the present process, especially those having molecular weights in excess of 3000 and HLB numbers higher than 17 may, when added to the fine particled polymer dispersion, frequently cause the formation of macroscopic coagulum. Several methods are envisaged to minimize or obviate the danger of such coagulum formation and these are as follows:

1. The addition of a stabilizing surfactant of the type normally employed in the process of emulsion polymerization and mentioned previously in that context to either the dispersion or the solution of the coarsening surfactant before or during the mixing of the two. Suitable stabilizing surfactants include non-ionic surfactants, e.g. polyethoxylated $C_{12}$-$C_{20}$ alcohols, alkylated phenols, amides and aminos with HLB numbers lower than 17 and preferably lower than 16 and with molecular weights lower than 1500 and preferably lower than 1200. Examples of other suitable stabilizing surfactants are the sulphates, sulphonates, phosphates and sulphosuccinates previously mentioned.

2. Adjustment of the pH value of the polymer dispersion and/or coarsening agent solution to a higher or lower value by the addition of bases or acids which have preferably been diluted with water. In one preferred embodiment of the present process, applicable to dispersions of carboxylated polymers, the pH of the dispersion is first raised to a value greater than will ensure the ionization of at least 50% of the carboxyl groups, by means of a base, which is preferably a volatile base, such as ammonia or an organic amine. The coarsening agent is then added, but does not cause any major alteration of the average particle size until the pH is lowered by the volatilization of the base or by chemical means. Examples of chemical means of lowering the pH of the mixture are the reaction of ammonia with formaldehyde or the addition of an acidic reagent like carbon dioxide, an organic or mineral acid, an acid salt or a substance capable of forming an acid such as an ester, acid amide, anhydride or halide.

3. In a further preferred embodiment of the present process, by the stepwise coarsening of the polymer dispersion. The stepwise coarsening may be achieved in several different ways.

For example:

a. By the sequential addition to the polymer dispersion of coarsening polyethoxylated surfactants as hereinbefore defined of increasing HLB numbers and molecular weight in two or more steps. In each step, single surfactants or blends of surfactants of the appropriate HLB numbers and molecular weights may be employed.

b. By the addition to the polymer dispersion of a mixture of one or more coarsening surfactants with one or more stabilizing surfactants followed in one or more steps by the addition of coarsening surfactant containing lower amounts of stabilizing surfactant or none at all. The last step is preferably carried out with no admixture of a stabilizing surfactant using a coarsening surfactant having an HLB value greater than 17.5 and a molecular weight in excess of 4000.

c. By the addition of the polymer dispersion to a solution of one or more coarsening surfactants optionally containing also one or more stabilizing surfactants and/or a pH adjusting base or acid. In the second or any subsequent step, a solution of coarsening surfactant is added to the pre-coarsened dispersion of the first step, preferably in the manner described under 3a.

It will be readily understood that suitable combinations of methods 1, 2 and 3a to 3c may be also employed.

When carrying out the present process it is furthermore envisaged that the polymer dispersions to be coarsened may be mixtures of two or more separate polymer dispersions. As previously mentioned, in this case only the polymer or polymers constituting the major proportion contained in the mixture need possess a glass transition temperature below the temperature at which the process is performed. It is also envisaged that one or more component dispersions present in a mixed polymer dispersion may have a larger average particle size than the fine particled dispersion to be coarsened. In fact it has been found that the presence of usually minor proportions of coarser particled dispersions may exert a beneficial regulating effect on the particle size distribution of the final coarsened material. This effect may be described as "seeding" or "nucleating" in as far as the coarser particles present act as seeds or nuclei for at least a proportion of the newly formed coarsened particles. The particle size distribution in the final product is influenced by both the amount and the particle size distribution of the seed dispersion employed. The regulation of particle size distribution in the final product may also be achieved by mixing a suitable "seed" dispersion with the solution of polyethoxylated surfactant, whether added by the stepwise method described above or not. The seed dispersion need not have a high surface tension nor a low glass transition temperature.

The present process may also be carried out by treating a fine particled polymer dispersion with the aforementioned coarsening agent in the presence of one or more of inert inorganic or organic fillers, pigments, vulcanizing agents, plasticizers, electrolytes, pH buffers, antifoaming agents, chelating agents and other ingredients customarily employed by those skilled in the art of compounding polymer dispersions.

The coarsened dispersions obtained by the present process may at any later stage be mixed with such further ingredients as their technological application will require. Examples of such ingredients are dispersants, surfactant stabilizers, acids, bases, plasticizers, vulcanizing ingredients and so on as is customary in the art of using such dispersions. The coarsened dispersions, with or without the addition of further, e.g. stabilizing, ingredients, may be concentrated by evaporation, creaming, centrifuging or similar means well known to those skilled in the art.

The following Examples in which all parts are parts by weight illustrate the invention and the manner in which it is to be performed.

EXAMPLE 1

62.5 parts butadiene, 36.5 parts styrene and 1 part acrylic acid were polymerized at 20°C. in a solution of 2 parts sodium lauryl sulphate, 0.5 part condensed sodium naphthalene sulphonate and 0.5 part of sodium sulphate in 150 parts demineralized water in the presence of 0.5 part of tertiarydodecyl mercaptan, 0.06 part of a sodium salt of ethylenediamine tetracetic acid and a redox initiator for the polymerization. The resulting polymer dispersion, after venting, had a nonvolatile content of 39.9%, a surface tension of 68 dynes/cm., a pH of 3.9 and contained particles having a mass average diameter of approximately 0.09 $\mu$ as determined by light scattering. The glass transition temperature of the polymer was −42°C.

To 2000 parts of the above polymer dispersion were added at ambient temperature 4.5 parts of ammonia solution (specific gravity 0.880) and 6.5 parts of a 30% solution of "Nonidet P80" (Shell Chemical Co.), a polyethoxylated octyl phenol having an HLB number of 14.3 and a molecular weight of about 700. After these additions the dispersion had a pH of 7.6 and a surface tension of 63 dynes/cm. To this dispersion was added a mixture of 0.5 part of "Nonidet P80" and 1 part of polyethoxylated castor oil (ECO) with an HLB number of 18.3 and a molecular weight of about 9600 dissolved in 25 parts water, the addition being made with stirring over a period of 2 minutes. 30 minutes later, a mixture of 0.5 part of $Na_4P_2O_7$ and 0.5 part of the above mentioned polyethoxylated castor oil dissolved in 20 parts of water was stirred in over a period of 20 minutes. At the end of this operation, the dispersion had a surface tension of 54 dynes/cm. which dropped to 50 dynes/cm. after a further 2 hours. A microscopic examination revealed that the major weight proportion of the polymer particles in the treated dispersion had diameters ranging from 0.5 $\mu$ to 5 $\mu$. After raising the pH to 8.8 – 9.0 with concentrated ammonia solution and adding 2 parts of "Nonidet P80" the dispersion was concentrated by evaporation to a non-volatile content of 63.2% without coagulum formation. The visocity of the concentrate was 900 centipoises, when measured on a Brookfield viscometer (spindle 3, speed 30 r.p.m.). The unmodified dispersion, stabilized with the same amounts of "Nonidet P80" as described above and adjusted to pH 9.2 with ammonia, reached a viscosity too high to measure on the Brookfield instrument at a non-volatile content of 52%. During concentration a large amount of coagulum was formed.

EXAMPLE 2

The procedure of Example 1 was repeated except for an admixture of 40 parts of a commercially available polymer dispersion to the dispersion to be treated. The admixed polymer dispersion had the following characteristics: Tg of polymer = −38°C., surface tension = 48 dynes/cm., pH = 8.3; mass average diameter of particles = 0.21 $\mu$; polymer type: carboxylated styrene-/butadiene/acrylonitrile copolymer; non-volatile content 56%. After coarsening, the resulting dispersion had a surface tension of 52 dynes/cm. Microscopic examination showed that the major volume proportion of the particles was in the range of 0.5 to 1.5 $\mu$. After the addition of 8 parts of concentrated ammonia solution (s.g. = 0.880) and 1.8 parts of "Nonidet P80", the dispersion was concentrated without coagulum formation to a non-volatile content of 60% when its viscosity was 1200 centipoises.

EXAMPLE 3

A polymer dispersion was prepared in the same manner as described in Example 1 but using as monomers to be copolymerized 62.5 parts butadiene, 35 parts styrene and 2.5 parts acrylic acid. This polymer dispersion had a non-volatile content of 39.8%, a surface tension of 62 dynes/cm., pH of 3.8 and contained particles having a mass average diameter of 0.11 $\mu$. The Tg of the polymer was −38°C.

To 2000 parts of the above polymer dispersion were added 5 parts of concentrated ammonia solution to raise the pH to 5.8, followed by 1 part of "Nonidet P80" dissolved in 10 parts of water. With stirring, 0.5 part of polyethoxylated octadecyl amine, having an HLB number of 18 and a molecular weight of approximately 2450, dissolved in 20 parts of water, were added at an even rate over 10 minutes; 30 minutes later 1.5 parts of the polyethoxylated castor oil of Example 1, dissolved in 60 parts of water were added at an even rate over 10 minutes. After waiting 1 hour, a further 1.5 parts of polyethoxylated castor oil dissolved in 20 parts of water were stirred in over 10 minutes. When examined 2 hours later, the dispersion had a surface tension of 52 dynes/cm. and was found to contain the major proportion of the polymer in particles of 0.5 to 1 $\mu$ diameter. The dispersion after stabilization with 12 parts of concentrated ammonia solution was concentrated without coagulum formation to a non-volatile content of 56% and a viscosity — at pH 9.0 — of 1200 centipoises.

The untreated dispersion could not be concentrated beyond 49% non-volatile content without the formation of large amounts of coagulum and without becoming so viscous at pH 9.0 as not to be pourable.

EXAMPLE 4

2500 parts of the polymer dispersion described in Example 1 were adjusted to a pH of 9.0 with concentrated ammonia solution. 0.5 part of the polyethoxylated castor oil of Example 1 dissolved in 10 parts of water were added with stirring. No appreciable coarsening of the dispersion occurred at this stage as evidenced by microscopic examination and surface tension measurements. The material thus obtained was then concentrated by evaporation under reduced pressure at a temperature of 45° to 50°C., leading to a concurrent loss of ammonia and drop in pH.

Progressive coarsening of the dispersion took place during this operation. The final concentrate obtained, when readjusted to a pH of 8.0 had a viscosity (Brookfield spindle 3/30 r.p.m.) of 900 centipoises, a non-volatile content of 60.2% and a surface tension of 43 dynes/cm.

EXAMPLE 5

A polymer latex was made in the same way as described in Example 1 but using as monomers to be copolymerized 70 parts of butadiene and 30 parts of styrene, and substituting 4 parts of potassium oleate for the 2 parts of sodium lauryl sulphate used in Example 1. The latex after venting had a non-volatile content of 39.5%, and was translucent in appearance.

The latex was further stabilized by addition of 1.5 parts Nonidet P80 per 100 parts dry polymer, after which it had a measured surface tension of 62.3 dynes/cm. This latex was then subdivided into 3 aliquots, which were treated by addition of polyethoxylated castor oils with HLB numbers of 16.8, 18.3 and 19.2 respectively. The following table shows the quantities of agglomerant added (expressed in parts of active material per 100 parts of dry polymer) and the consequent change in surface tension:

| Latex Aliquot | Ethoxylated Castor Oil (parts added) | | | Surface Tension dynes/cm |
|---|---|---|---|---|
| | HLB 16.8 | 18.3 | 19.2 | |
| A | 0.10 | 0.05 | — | 55.0 |
| B | 0.10 | — | 0.05 | 60.0 |
| C | — | 0.15 | — | 57.4 |

In the above example, additions of E.C.O. were made sequentially in order of HLB number, about 5 minutes being allowed between additions. The increase in particle size was visually detectable by a change from translucency to opacity, and confirmed by the drop in surface tension.

EXAMPLE 6

Latex produced as in Example 5 was further stabilized by addition of 2.5 parts of potassium oleate per 100 parts dry polymer, after which it had a surface tension of 65.5 dynes/cm. The latex was then divided into three aliquots, two of which were agglomerated by addition of polyoxyethylated castor oils with HLB numbers of 18.3 and 19.2 respectively. In the following table, the surface tension is expressed (A) as measured immediately after addition of agglomerant, and (B) as measured 16 hours after addition of agglomerant:

| Latex Aliquot | Ethoxylated Castor Oil (parts added) | | Surface Tension dynes/cm | |
|---|---|---|---|---|
| | HLB 18.3 | 19.2 | (A) | (B) |
| I | 0.10 | 0.10 | 55.8 | 50.5 |
| II | — | 0.10 | 57.6 | 50.5 |
| III | nil | nil | (65.5) | |

The three aliquots of latex were concentrated by evaporation, the final solids contents and viscosities being shown in the table below.

| Latex Aliquot | Solids Content % | Viscosity cps |
|---|---|---|
| I | 66.4 | 940 |
| II | 65.1 | 1040 |
| III | 47 | (pasty) |

Viscosities were measured by means of a Brookfield Viscometer using Spindle 3 at Speed 60.

EXAMPLE 7

62.5 parts butadiene, 36.5 parts styrene and 1 part acrylic acid were polymerized at 20°C in a solution of 2.5 parts sodium lauryl sulfate, 0.5 part condensed sodium naphthalene sulfonate and 0.5 part sodium sulfate in 150 parts demineralized water in the presence of 0.5 part t-dodecyl mercaptan using a redox polymerization system.

After polymerization, the latex had a non-volatile solids content of 38.3% and a pH value of 4.3 and surface tension 62 dynes/cm. The particle size, by light scattering, was found to be 0.12 microns.

A portion of latex containing 100 parts by weight polymer solids was added to a mixture of 0.5 part Nonidet p80 and 0.1 part of an ethoxylated caster oil having an HLB number of 18.3 dissolved in 5 parts by weight of water. After 2 hours a further addition of 0.1 part Nonidet p80 and 0.1 part of ethoxylated castor oil dissolved in 5 parts water was made. The surface tension fell to 55.5 dynes/cm. After a further 2 hours 0.1 part of an ethoxylated castor oil having an HLB number of 19.1 dissolved in 2 parts water was added. The surface tension subsequently dropped to 50 dynes/cm.

Ammonia was added to raise the pH to 8.8, after which the surface tension was found to be 41.5 dynes/cm.

After concentration by evaporation the non-volatile solids content was raised to 61.0%, with a viscosity of 650 cps measured on a Brookfield viscometer, model LVT, spindle 3, speed 60.

Another portion of the original latex, similarly treated except that no ethoxylated castor oil was added, was concentrated until excessive viscosity made further concentration impracticable. The non-volatile solids content at that stage was 51.2%.

EXAMPLE 8

A polymer latex was made in the same way as described in Example 7 except that the monomers to be copolymerized were 77.5 parts butadiene, 21.5 parts styrene and 1 part acrylic acid.

After polymerization the latex had a non-volatile solids content of 38.5%, surface tension of 69.0 dynes/cm., pH 4.3 and mean particle size of 0.08 $\mu$ as measured by light scattering. Sodium lauryl sulfate was added as a 10% aqueous solution to adjust the surface tension to 60 dynes/cm. and 260 parts by weight of the latex was then added to a mixture of 0.1 part ethoxylated castor oil having an HLB number of 18.3 and 0.5 part of Nonidet P80 dissolved in 5 parts of water, and allowed to stand. After 2 hours the surface tension had fallen to 57.5 dynes/cm.

To the latex was then added a further 0.1 part of the above polyethoxylated castor oil dissolved in 2 parts of water. After a further 2 hours was added 0.5 part of a polyethoxylated castor oil having an HLB number of 19.1. The surface tension was then measured and was found to be 51 dynes/cm. The latex at this stage had a particle size of about 0.5 microns, and a pH of 4.5.

One portion of the agglomerated latex was concentrated by evaporation, without adjustment of pH, to a non-volatile solid content of 57.5%, the viscosity of the concentrate being 750 cps as measured on a Brookfield viscometer, model LVT, spindle 3, speed 60.

A further portion of the agglomerated latex was then adjusted to pH 8.5 by addition of ammonia and concentrated to a non-volatile content of 58%. The viscosity of the concentrated latex was 690 cps as measured by a Brookfield viscometer, model LVT, spindle 3, speed 60.

The same latex treated in the same way but omitting additions of polyethoxylated castor oil could not be concentrated to a solids content greater than 49% owing to excessive viscosity.

EXAMPLE 9

A polymer dispersion was prepared in the same way as described in Example 7 but using as monomers to be polymerized 62 parts of butadiene, 35 parts of styrene and 3 parts of acrylic acid. After venting, the dispersion had a non-volatile solids content of 39.2%, a surface tension of 59.2 dynes/cm., pH 3.2, and an average particle size of 0.08 $\mu$.

To 255 parts by weight of this latex (containing 100 parts by weight of polymer solids) was added a mixture of 0.5 part Nonidet P80 and 0.1 part of ethoxylated castor oil having an HLB number of 18.3 dissolved in 5 parts of water. After 2 hours a further addition of 0.1 part Nonidet P80 and 0.1 part of the same ethoxylated castor oil was made, and after a further 2 hours was added 0.1 part of an ethoxylated castor oil having an HLB number of 19.1 dissolved in 2 parts of water. The surface tension immediately after this addition was 49.0 dynes/cm., and 2 hours later had fallen to 44.0 dynes/cm. The average particle size at this stage was 0.7 $\mu$ and the pH was 3.5.

The agglomerated latex was concentrated to a non-volatile solids content of 60.5% without adjustment of pH, its viscosity then being 670 cps measured by Brookfield viscometer LVT, Spindle 3, Speed 60. An attempt to concentrate the original unagglomerated latex was discontinued owing to excessive thickening at a solids content of 47%.

EXAMPLE 10

A latex of the same constitution as that of Example 7, and made in exactly the same manner, was made alkaline by addition of ammonia until the pH reached 8.8, at which pH the bound carboxyl groups were substantially neutralized. The surface tension was then 56 dynes/cm.

To a quantity of this latex containing 100 parts of solids was added 0.2 part of an ethoxylated castor oil having an HLB number of 19.1 dissolved in 2 parts of water, no other surfactant being present. After standing for 30 minutes the surface tension had fallen to 49 dynes/cm. The temperature of the latex was then raised to 50°C, and after a further 2 hours the surface tension was measured and found to be 44 dynes/cm.

The latex was concentrated to a non-volatile solids content of 58.5%, while an unagglomerated portion of the same original latex became pasty at a concentration of 46%.

EXAMPLE 11

A latex was prepared of the same composition as that of Example 1, and after polymerization had a non-volatile solids content of 38.5%, pH 5.0, an average particle size of 0.08 $\mu$, and a surface tension of 61.5 dynes/cm.

A portion of this latex containing 100 parts of polymer solids was agglomerated by addition of an aqueous solution containing 0.2 part of a polyethoxylated octadecyl amine[1] having an HLB value of 18 and a molecular weight of approximately 2450. After standing for 24 hours the surface tension had fallen to 56 dynes/cm., and the average particle size had increased to about 0.3 $\mu$. After addition of agglomerant, the appearance of the latex changed from opalescence to opacity.

(1) Ethomeen 18/60 (Armour Hess)

A second portion of the latex containing 100 parts of polymer solids was agglomerated by addition of an aqueous solution containing 0.2 part of ethoxylated sorbitan monooleate[2] having an HLB number of 17.8. After 24 hours the surface tension had fallen to 49 dynes/cm. and the average particle size had increased to 0.4 $\mu$.

(2) Crillet 475 (Croda Chemicals Ltd.)

A third portion of the latex containing 100 parts of polymer solids was agglomerated by addition of an aqueous solution containing 0.2 part polyoxyethylene glyceryl ester having an HLB number of 18.1. After 24 hours the surface tension had fallen to 43.4 dynes/cm. and the average particle size had increased to about 0.5 $\mu$.

It will be noted from the preceding examples that time of agglomeration is not particularly critical in that quite significant increases in particle size are obtained in as little as 10–15 minutes after admixture of the coarsening agent with the latex. Nevertheless, in some instances further increases in particle size are observed if the admixture is allowed to stand for 1–2 hours or even longer.

EXAMPLE 12

62.5 parts butadiene, 36.5 parts styrene and 1 part acrylic acid were polymerized at 20°C in a solution of 2.5 parts sodium lauryl sulphate, 0.5 parts condensed sodium naphthalene sulphonate and 0.5 parts sodium sulphate in 150 parts demineralized water in the presence of 0.5 parts t-dodecyl mercaptan using a redox polymerization system.

After polymerization the latex had a non-volatile solids content of 38.3% and a pH value of 4.3 and surface tension 62 dynes/cm. The particle size, by light scattering, was found to be 0.12 microns.

A portion of this latex containing 100 parts by weight of polymer solids was made alkaline with ammonia to pH 9.7. The latex was then added with stirring to 0.2 parts of an ethoxylated sorbitan monooleate (having an HLB number of 17.8), dissolved in 4 parts of demineralized water. This mixture was allowed to stand overnight at room temperature after which the surface tension had fallen to 47.7 dynes/cm. It was then concentrated by evaporation under reduced pressure at 50°C to yield a latex having a non-volatile solids content of 58.0% and a viscosity of 510 cps.

A sample of the latex at pH 9.7 but without ethoxylated sorbitan monooleate could not be concentrated to a nonvolatile solids content greater than 51.2% because of excessive thickening.

EXAMPLE 13

A polymer dispersion was prepared in the same way as described in Example 12 but using as monomers to be polymerized 62 parts of butadiene, 35 parts of styrene and 3 parts of acrylic acid. The dispersion had a non-volatile solids content of 39.2%, a surface tension of 59.2 dynes/cm, pH 3.2 and an average particle size of 0.08 $\mu$.

A portion of this latex, containing 100 parts by weight of polymer solids was added, without adjustment of pH, to 0.2 parts of an ethoxylated sorbitan monooleate (having an HLB number of 17.8) dissolved in 4 parts of demineralized water. After standing overnight at room temperature the surface tension had fallen to 49.5 dynes/cm. The latex was then concentrated without further addition of stabilizing agent or alkali, to yield a concentrate having a non-volatile solids content of 59.6% and a viscosity of 410 cps.

The same latex without addition of ethoxylated sorbitan monooleate could not be concentrated to a solids content greater than 47% owing to excessive thickening.

I claim:

1. A method for enlarging the particle size of stabilized latices of water-immiscible polymers prepared by aqueous emulsion polymerization, wherein the dispersed polymer particles in the latex are less than completely covered by agglomerating surfactant, which comprises admixing with said latex at a temperature which is above the glass transition temperature of a major proportion of the polymer contained in the latex a polyethoxylated agglomerating surfactant having an HLB number of from 16 to 19.5 which surfactant is a full ester of aliphatic polyol and one or more long chain fatty acids at least one of which acids contains an ethoxylatable substituent group.

2. The method of claim 1 in which a plurality of polyethoxylated agglomerating surfactants are admixed with the latex sequentially in order of increasing HLB numbers.

3. The method of claim 1 in which a plurality of mixtures having a fixed concentration of polyethoxylated agglomerating surfactant having an HLB number of at least 17 and a molecular weight of at least 4,000 with successively smaller concentrations of a stabilizing surfactant having an HLB number below 17 and molecular weight below 1500 are formed and admixed with the latex sequentially in order of decreasing concentrations of agglomerating surfactant, upon completion of which said polyethoxylated surfactant alone is admixed with the latex.

4. The method of claim 1 in which following an initial admixture of polyethoxylated agglomerating surfactant with the latex, the pH of the admixture is adjusted as necessary to reduce coagulum formation and additional polyethoxylated agglomerating surfactant is admixed with the thusly adjusted admixture of latex and the said surfactant.

5. The method of claim 1 in which the temperature is at least 20°C above the glass transition temperature of the major proportion of polymers contained in the latex.

6. The method of claim 1 in which the polyethoxylated agglomerating surfactant has a molecular weight of from 1,800 to 25,000.

7. The method of claim 1 in which the polyethoxylated agglomerating surfactant is added to the latex in an amount corresponding to 0.01 to 5 parts by weight per 100 parts by weight of dry latex polymer solids.

8. The method of claim 6 in which the polyethoxylated agglomerating surfactant is comprised of a mixture of (a) polyethoxylated agglomerating surfactant having an HLB number of at least 17 and molecular weight of at least 4,000 and (b) stabilizing surfactant having an HLB number of below 17 and molecular weight below 1500.

9. The method of claim 1 in which the water-immiscible polymer is a polymer of a $C_{4-6}$ conjugated diolefin.

10. The method of claim 1 in which the water-immiscible polymer is copolymer of a $C_{4-6}$ conjugated diolefin and at least one ethylenically unsaturated comonomer.

11. The method of claim 1 in which the polyethoxylated agglomerating surfactant is derived from a naturally occurring glyceride.

12. The method of claim 11 in which the naturally occurring glyceride is castor oil.

13. The method of claim 1 in which the polyethoxylated agglomerating surfactant is an ester of an aliphatic carboxylic acid with an aliphatic polyol selected from the group consisting of (1) esters in which a plurality of fatty acid groups is attached to the polyol residue, (2) esters in which a plurality of polyethylene oxide chains is attached to the polyol and (3) mixtures thereof.

14. A method for enlarging the particle size of stabilized latices of water-immiscible carboxylated polymers prepared by aqueous emulsion polymerization, wherein the dispersed polymer particles in the latex are less than completely covered by agglomerating surfactant, comprising the sequential steps:
  1. adjusting the pH of the latex upwardly to a value sufficient to ionize at least about 50% of the carboxylic by addition of a base;
  2. admixing with said latex at a temperature which is above the glass transition temperature of a major proportion of the polymer contained in the latex a polyethoxylated agglomerating surfactant having an HLB number of from 16 to 19.5 which surfactant is a full ester of aliphatic polyol and one or more long chain fatty acids at least one of which acids contains an ethoxylatable substituent group; and
  3. adjusting the pH of the latex admixture downwardly to a level sufficient to effect substantial enlargement of the latex polymer particles.

* * * * *